(12) United States Patent
Whitton

(10) Patent No.: US 7,374,513 B2
(45) Date of Patent: May 20, 2008

(54) METHOD AND APPARATUS FOR ADAPTIVE CONTROL OF CLOSED THROTTLE DOWNSHIFTS IN AN AUTOMATIC TRANSMISSION

(75) Inventor: Matthew D. Whitton, Howell, MI (US)

(73) Assignee: General Motors Corporation, Detroit, MI (US)

( * ) Notice: Subject to any disclaimer, the term of this patent is extended or adjusted under 35 U.S.C. 154(b) by 725 days.

(21) Appl. No.: 10/868,187

(22) Filed: Jun. 14, 2004

(65) Prior Publication Data

US 2005/0288153 A1    Dec. 29, 2005

(51) Int. Cl.
*F16H 61/04* (2006.01)

(52) U.S. Cl. .................. 477/146; 477/144; 477/145; 701/58; 701/59; 701/60; 701/61

(58) Field of Classification Search ............ 701/58–61; 477/144–146
See application file for complete search history.

(56) References Cited

U.S. PATENT DOCUMENTS

| | | | | |
|---|---|---|---|---|
| 5,070,747 A | * | 12/1991 | Lentz et al. | 477/149 |
| 5,211,079 A | * | 5/1993 | Runde et al. | 477/61 |
| 5,411,451 A | * | 5/1995 | Ando et al. | 477/144 |
| 5,865,707 A | * | 2/1999 | Shimada et al. | 477/44 |
| 5,888,170 A | * | 3/1999 | Takiguchi et al. | 477/146 |
| 5,897,456 A | * | 4/1999 | Takiguchi | 477/146 |
| 6,308,125 B1 | * | 10/2001 | Gleason et al. | 701/67 |
| 6,361,474 B1 | * | 3/2002 | Gleason et al. | 477/143 |
| 6,374,170 B1 | * | 4/2002 | Kresse et al. | 701/51 |
| 6,478,713 B1 | * | 11/2002 | Runde et al. | 477/107 |
| 6,702,714 B2 | * | 3/2004 | Sato et al. | 477/146 |
| 6,761,664 B2 | * | 7/2004 | Ayabe et al. | 477/144 |
| 6,880,393 B2 | * | 4/2005 | Bulgrien et al. | 73/118.1 |
| 6,915,890 B1 | * | 7/2005 | Whitton et al. | 192/85 R |
| 2005/0288153 A1 | * | 12/2005 | Whitton | 477/146 |

* cited by examiner

*Primary Examiner*—Thomas Black
*Assistant Examiner*—Wae Louie

(57) ABSTRACT

The present invention provides a method and apparatus for adaptively controlling a closed throttle downshift in an automatic transmission wherein a transmission aberration during a shift is diagnosed and corrected during subsequent closed throttle downshifts. The invention is carried out by monitoring transmission characteristics including input speed, output speed and shift duration during a closed throttle downshift, and identifying departures from acceptable patterns. Each type of departure calls for a particular remedy, and a suitable adjustment is calculated based on the times and/or the commanded pressures at certain times, the adjustment being implemented by changing one or more initial conditions for the next shift of the same type. The adjustments may have to be large to make a full or significant partial correction at the next shift. Conversely small increments may be necessary to avoid over-correction.

19 Claims, 5 Drawing Sheets

METHOD AND APPARATUS FOR ADAPTIVE CONTROL OF CLOSED THROTTLE DOWNSHIFTS IN AN AUTOMATIC TRANSMISSION

TECHNICAL FIELD

The present invention relates to a method and apparatus for improving closed throttle downshifts of an automatic transmission.

BACKGROUND OF THE INVENTION

Generally, a motor vehicle automatic transmission includes a number of gear elements coupling its input and output shafts, and a related number of torque establishing devices such as clutches and brakes that are selectively engageable to activate certain gear elements for establishing a desired speed ratio between the input and output shafts. As used herein, the terms "clutches" and "torque transmitting devices" will be used to refer to brakes as well as clutches.

The input shaft is connected to the vehicle engine through a fluid coupling such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio.

The speed ratio is defined as the transmission input speed or turbine speed divided by the output speed. Thus, a low gear range has a high speed ratio and a higher gear range has a lower speed ratio. To perform a downshift, a shift is made from a low speed ratio to a high speed ratio. In the type of transmission involved in this invention, the downshift is accomplished by disengaging a clutch associated with the lower speed ratio and engaging a clutch associated with the higher speed ratio, to thereby reconfigure the gear set to operate at the higher speed ratio. Shifts performed in the above manner are termed clutch-to-clutch shifts and require precise timing in order to achieve high quality shifting.

The quality of shift depends on the cooperative operation of several functions, such as pressure changes within oncoming and off-going clutch apply chambers and the timing of control events. Moreover, manufacturing tolerances in each transmission, changes due to wear, variations in oil quality and temperature, etc., lead to shift quality degradation.

SUMMARY OF THE INVENTION

It is therefore an object of the invention to provide a method and apparatus for adaptively controlling a closed throttle downshift in an automatic transmission wherein a transmission aberration during a shift is diagnosed and corrected during subsequent closed throttle downshifts.

It is a further object to provide such a method which is capable of making both large and small corrections.

The method of the invention is carried out by monitoring transmission characteristics including input speed, output speed, and shift duration during a closed throttle downshift, and identifying departures from acceptable patterns. Each type of departure calls for a particular remedy, and a suitable adjustment is calculated and implemented by changing certain parameters in the shift control to alter one or more conditions for the next shift of the same type. The adjustments may have to be large to make a full or significant partial correction at the next shift. Conversely, small increments may be necessary to avoid over-correction.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENT

The control of this invention is described in the context of a multi-ratio power transmission having a planetary gear set of the type described in the U.S. Pat. No. 4,070,927 to Polak, and having an electro-hydraulic control of the type described in U.S. Pat. No. 5,601,506 to Long et al, both of which are hereby incorporated by reference in their entireties. Accordingly, the gear set and control elements shown in FIG. 1 hereof have been greatly simplified, it being understood that further information regarding the fluid pressure routings and so on may be found in the aforementioned patents.

Figure 1:
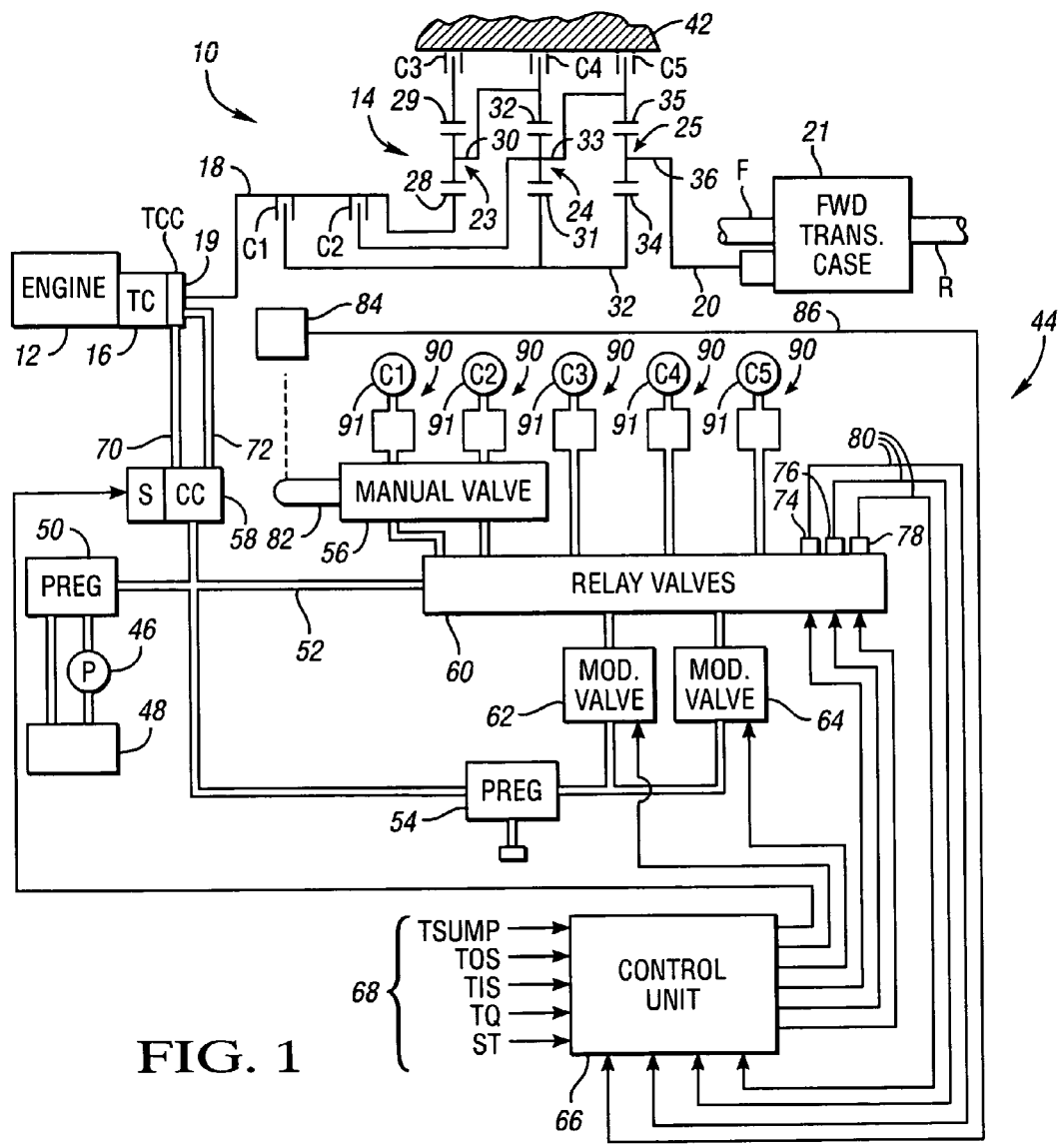
FIG. 1 is a schematic illustration of an automatic transmission.

Referring to FIG. 1, the reference numeral 10 generally designates a vehicle power train including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gear sets, designated generally by the reference numerals 23, 24 and 25. The planetary gear set 23 includes a sun gear member 28, a ring gear member 29, and a planet carrier assembly 30. The planet carrier assembly 30 includes a plurality of pinion gears rotatably mounted on a carrier member and disposed in meshing relationship with both the sun gear member 28 and the ring gear member 29. The planetary gear set 24 includes a sun gear member 31, a ring gear member 32, and a planet carrier assembly 33. The planet carrier assembly 33 includes a plurality of pinion gears rotatably mounted on a carrier member and disposed in meshing relationship with both the sun gear member 31 and the ring gear member 32. The planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and the ring gear member 35.

The input shaft 18 continuously drives the sun gear 28 of gear set 23, selectively drives the sun gears 31, 34 of gear sets 24, 25 via clutch C1, and selectively drives the carrier 33 of gear set 24 via clutch C2. The ring gears 29, 32, 35 of gear sets 23, 24, 25 are selectively connected to ground 42 via clutches (i.e., brakes) C3, C4 and C5, respectively.

The state of the clutches C1-C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Downshifting from one forward speed ratio to another is generally achieved by disengaging one clutch (referred to as the off-going clutch) while engaging another clutch (referred to as the on-coming clutch). For example, the transmission 14 is downshifted from second to first by disengaging clutch C4 while engaging clutch C5.

The torque converter clutch 19 and the transmission clutches C1-C5 are controlled by an electro-hydraulic control system, generally designated by reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle, and a number of solenoid-operated fluid control valves 58, 60, 62 and 64.

The electronic portion of the electro-hydraulic control system 44 is primarily embodied in the transmission control unit 66, or controller, which is microprocessor-based and conventional in architecture. The transmission control unit 66 controls the solenoid-operated fluid control valves 58-64 based on a number of inputs 68 to achieve a desired transmission speed ratio. Such inputs include, for example, signals representing the transmission input speed TIS, a driver torque command TQ, the transmission output speed TOS, and the hydraulic fluid temperature Tsump. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid-operated fluid control valves 58-64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1-C5. Valves 62, 64 are of the modulated type. For any selected ratio, the control unit 66 activates a particular combination of relay valves 60 for coupling one of the modulated valves 62, 64 to the on-coming clutch, and the other one of the modulated valves 62, 64 to the off-going clutch.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands. Thus, the clutches C1-C5 are responsive to the pressure commands via the valves 58-64 and their respective actuating elements (e.g., solenoids, current-controlled force motors).

As indicated above, each shift from one speed ratio to another includes a fill or preparation phase during which an apply chamber 91 of the on-coming clutch is filled in preparation for torque transmission. Fluid supplied to the apply chamber compresses an internal return spring (not shown), thereby stroking a piston (not shown). Once the apply chamber is filled, the piston applies a force to the clutch plates, developing torque capacity beyond the initial return spring pressure. Thereafter, the clutch transmits torque in relation to the clutch pressure, and the shift can be completed using various control strategies. The usual control strategy involves commanding a maximum on-coming clutch pressure for an empirically determined fill time, and then proceeding with the subsequent phases of the shift. The volume of fluid required to fill an apply chamber and thereby cause the clutch to gain torque capacity is referred to as the "clutch volume."

The controller 66 determines the timing of the pressure commands based on an estimated on-coming clutch volume, i.e., an estimated volume of fluid required to fill the on-coming clutch apply chamber and thereby cause the on-coming clutch to gain torque capacity. An estimated on-coming clutch volume must be used because the actual on-coming clutch volume may vary over time as a result of wear, and may vary from transmission to transmission because of build variations and tolerances.

The controller 66 calculates an estimated volume of fluid supplied to the on-coming clutch apply chamber as the chamber is being filled based on a mathematical model of the transmission hydraulic system, and compares the estimated volume of fluid supplied to the estimated clutch volume. When the estimated volume of fluid supplied to the apply chamber equals the estimated clutch volume, then the on-coming clutch should gain capacity. A hydraulic flow model for use in estimating the volume of fluid supplied to an apply chamber is described in U.S. Pat. No. 6,285,942, issued Sep. 4, 2001 to Steinmetz et al, which is hereby incorporated by reference in its entirety. The model inputs include the fill pressure, the shift type ST (for example, a 2-1 downshift), the speed of pump 46, and the temperature Tsump of the hydraulic fluid. The output of the model is the on-coming clutch flow rate. The flow rate is integrated by an integrator to form the estimated cumulative volume of fluid supplied to the apply chamber. In a preferred embodiment, the controller 66 subtracts the estimated volume of fluid supplied from the estimated clutch volume to determine an estimated clutch volume remaining. If the controller is accurate, the estimated clutch volume remaining will be zero at the time the on-coming clutch gains torque capacity.

Figure 1A:
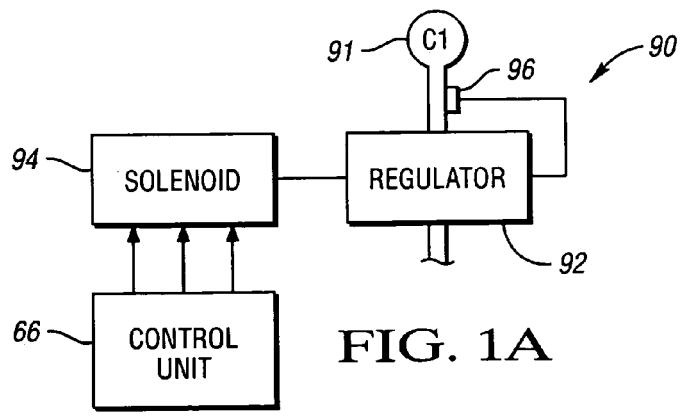
FIG. 1A is a schematic illustration of a valve of FIG. 1.

Alternatively instead of modulated valves 62, 64 and relay valves 60, the transmission may include a plurality of individual control valves each operatively connected to a respective apply chamber 91. Referring to FIG. 1A, an exemplary fluid control valve 90 includes a regulator 92, a solenoid 94 and a pressure sensor 96. Each control valve 90 is configured to provide fluid to the apply chamber 91 of its respective clutch C1-C5 at either a full feed state or a regulating state.

The method of the present invention establishes three adaptive parameters for each closed throttle downshift. The adaptive parameters include an off-going clutch pressure adaptive parameter, an on-coming clutch pressure adaptive parameter, and an on-coming clutch volume adaptive parameter. The adaptive parameters are so named because they are monitored and may be adapted to improve subsequent downshifts. The term "closed throttle downshift" generally refers to a downshift when there is no gas pedal demand, but as used herein refers to any downshift that takes place during a period of very low input torque. Therefore a closed throttle downshift may take place while the throttle is somewhat open if the input torque is sufficiently low.

Figure 2A:
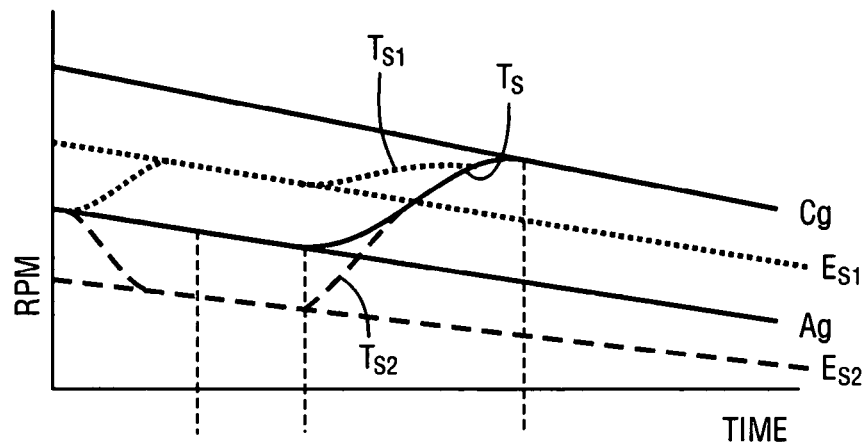
FIG. 2A is a graphical depiction of turbine speed vs. time during an optimal closed throttle downshift, and further showing the shift aberrations "slip early" and "underlap"
Figure 2B:
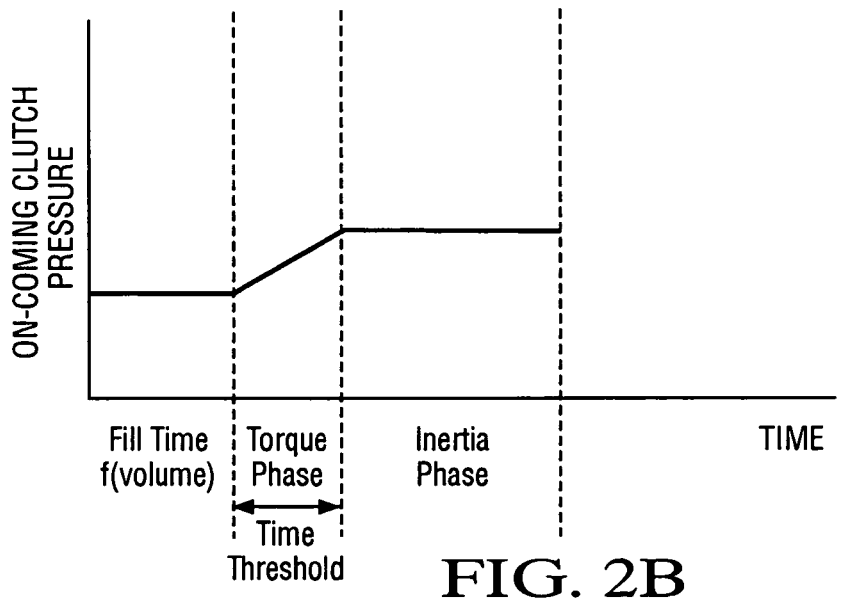
FIG. 2B is a graphical depiction of the on-coming clutch pressure vs. time during the optimal closed throttle downshift of FIG. 2A.
Figure 2C:
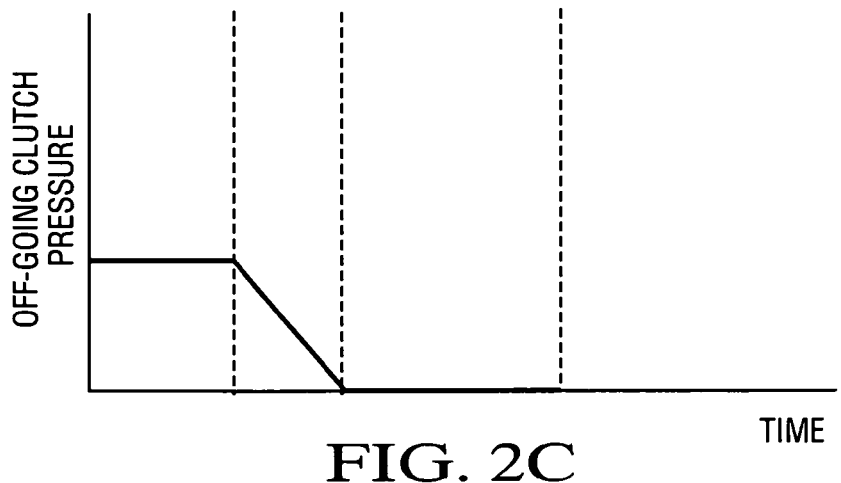
FIG. 2C is a graphical depiction of the off-going clutch pressure vs. time during the optimal closed throttle downshift of FIG. 2A.

FIGS. 2A-2C show a predefined optimal closed throttle downshift. More precisely, FIG. 2A shows torque converter turbine speed $T_s$ transitioning from the attained gear speed $A_g$ to the commanded gear speed $C_g$. Those skilled in the art will recognize that the turbine and input shaft are interconnected, and, accordingly, the turbine speed is the same as the input shaft speed. Those skilled in the art will also recognize that the attained gear speed $A_g$ is the transmission output speed multiplied by the currently selected gear ratio, whereas the commanded gear speed $C_g$ is the transmission output speed multiplied by the commanded gear ratio. Accordingly, during a closed throttle 4-3 downshift, $A_g$ is transmission output speed multiplied by the fourth gear ratio and $C_g$ is the transmission output speed multiplied by the third gear ratio.

FIG. 2B shows on-coming clutch pressure during the closed throttle downshift, including the fill time in which the on-coming clutch apply chamber is filled and wherein on-coming pressure is zero, the torque phase during which the on-coming clutch begins to generate torque, and the inertia phase. Similarly, FIG. 2C shows off-going clutch pressure during the closed throttle downshift. As seen in FIGS. 2A-2C, during an optimal closed throttle downshift, off-going clutch pressure is maintained as the on-coming apply chamber is filled so that the off-going clutch does not slip and the turbine speed $T_s$ remains at the attained gear speed $A_g$. After the on-coming clutch apply chamber is filled and the on-coming clutch begins to generate torque, the off-going clutch pressure is reduced. The timing of an optimal closed throttle downshift is such that as the off-going clutch pressure reaches zero and is thereby released, the on-coming clutch is engaged to effect the downshift and the turbine speed $T_s$ correspondingly shifts from the attained gear speed $A_g$ to the commanded gear speed $C_g$.

The shift aberrations, i.e., deviations, from the predefined optimal shift that are correctable by adjusting the off-going pressure adaptive parameter are also graphically represented in FIG. 2A. Turbine speed $T_{s1}$ represents the shift aberration "slip early" and turbine speed $T_{s2}$ represents the shift aberration "underlap." Slip early and underlap are both attributable to inadequate off-going clutch pressure. The characteristic defining the difference between the two aberrations is the relative engine speed during a particular closed throttle downshift. More precisely, slip early is the case wherein engine speed $E_{s1}$ is greater than attained gear speed Ag such that turbine speed $T_{s1}$ prematurely, in comparison to the optimal shift, deviates therefrom by increasing. Similarly, underlap is the case wherein engine speed $E_{s2}$ is less than attained gear speed Ag such that turbine speed $T_{s2}$ prematurely, in comparison to the optimal shift, deviates therefrom by decreasing.

The optimal off-going clutch pressure during a closed throttle downshift is that which is just enough to prevent premature slip of the off-going clutch. If premature slip is observed, the off-going pressure adaptive parameter is incrementally increased during subsequent shifts until the premature slip condition no longer exists. In this manner, the off-going pressure adaptive parameter is self-correcting when the estimated value thereof is too low. To correct the adaptive parameter when the estimated value is too high, the off-going pressure adaptive parameter is revised after a predetermined number of shifts without premature slip. More precisely, if a predetermined number of shifts occur without premature slip, the off-going pressure adaptive parameter is incrementally reduced during subsequent shifts until premature slip is observed and thereafter is incrementally increased until the premature slip condition no longer exists. In this manner, the off-going pressure adaptive parameter is maintained at the optimal value, which is just above the premature slip threshold.

Figure 3:
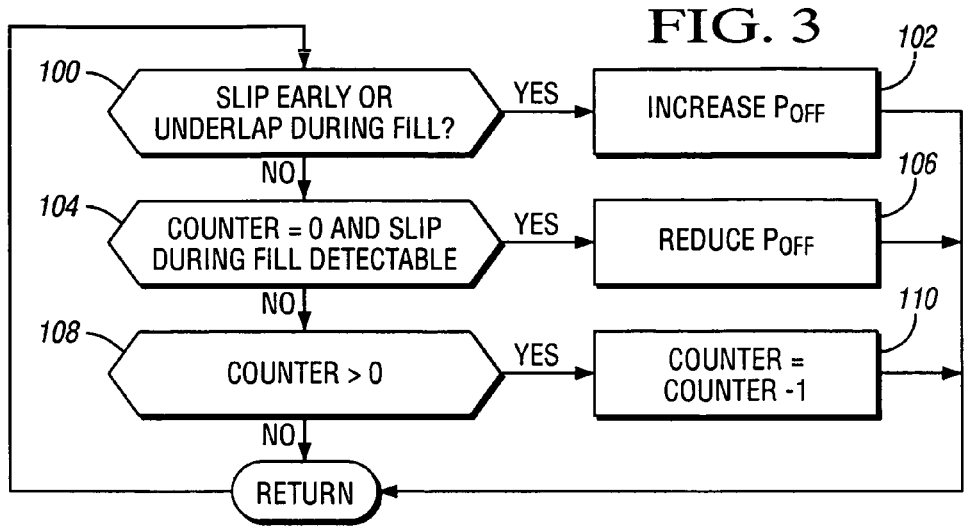
FIG. 3 is a block diagram illustrating a method of adjusting the off-going pressure adaptive parameter of the present invention.

A method of adjusting the off-going clutch pressure adaptive parameter is depicted in FIG. 3. With reference to FIGS. 2A-C and 3, premature deviation of turbine speed $T_s$ from attained gear speed $A_g$ is monitored by the control unit to determine the occurrence of slip early or underlap during fill (Step 100). If turbine speed $T_s$ falls more than a predetermined amount, e.g., 50 rpm, below attained gear speed $A_g$, underlap is indicated. Similarly, if turbine speed $T_s$ prematurely rises more than a predetermined amount, e.g., 50 rpm, above attained gear speed $A_g$, slip early is indicated. If either slip early or underlap during fill is detected, the off-going clutch pressure adaptive parameter ($P_{OFF}$) is increased at step 102. At step 104, a counter is monitored. The counter is set to a predetermined integer value after $P_{OFF}$ is increased in step 102, and is decreased by one at step 110 when premature slip is not detected at step 100. If the counter equals zero, and the slip is observable, then the off-going clutch pressure is reduced for each subsequent shift at step 106 until premature slip is observed. Slip is not observable when engine speed is near, e.g., +/−50 rpm, the attained gear speed $A_g$. Steps 108 and 110 reduce the counter by one each time the transmission downshifts without premature slip. Thereafter the steps of the off-going pressure adaptive described hereinabove are repeated.

The off-going pressure adaptive parameter is preferably increased or decreased in steps 102 and 106 by a corrective value obtained by the following equation: (full correction) (scalar)(gain). Full correction is either a calibration or measured signal, such as from turbine speed, that gives a term to correct the adaptive problem. The scalar is a function of the shift aberration type, since some shift aberrations require more aggressive corrective action than others. The gain is related to an adaptive error counter that tracks the direction the off-going pressure adaptive parameter is moving. If the off-going pressure adaptive parameter increases during consecutive downshifts, the adaptive error counter is increased by one to a predetermined maximum value, e.g., seven. Similarly, if the off-going pressure adaptive parameter decreases during consecutive downshifts, the adaptive error counter is decreased by one to a predetermined minimum value, e.g., negative seven. The gain is established based on the adaptive error counter value such that the magnitude of the gain is proportional to the absolute value of the adaptive error counter. In other words, each consecutive increase or decrease in the adaptive error counter gives rise to a larger gain. In this manner the degree of adaptive correction can be increased if the off-going pressure adaptive parameter has been commanded to change in one direction, i.e., increased or decreased, during consecutive downshifts. Thus, the corrective value varies in response to the quantity of consecutive monitored downshifts in which a shift aberration occurs. If the off-going pressure adaptive parameter is increased and then subsequently decreased, or vice versa, the adaptive error counter is reset to zero and the gain becomes its minimal value. Additionally, it should be appreciated that the on-coming pressure and volume adaptive parameters are increased and decreased in a similar manner.

The transmission control unit uses the offgoing clutch pressure adaptive parameter to determine the appropriate offgoing clutch pressure command in order to achieve a desired offgoing clutch torque. Torque applied by the off-going clutch is related to off-going clutch pressure according to the equation $T=(P_{offcmd}-P_{off})G_{off}$, where $T_{off}$ is the off-going clutch torque, $P_{offcmd}$ is the on-corning pressure command, $P_{off}$ is the offgoing clutch pressure adaptive parameter, and $G_{off}$ is a multiplication factor for the off-going clutch. The off-going clutch pressure adaptive parameter represents the pressure applied by the on-coming clutch return spring, and is adapted and adjusted as described above with reference to FIG. 3 to account for system variations. The optimal off-going clutch torque is based on a predefined mathematical model that describes what the torque should be to result in desired shift quality using such factors as time and input torque. In an exemplary embodiment, the optimal off-going clutch torque is defined in terms of an optimal torque profile during a shift. In order to generate an actual off-going clutch torque profile that most closely resembles the optimal off-going torque profile, the equation $T_{off}=(P_{offcmd}-P_{off})G$ is solved for commanded pressure $P_{offcmd}$.

This pressure to torque relationship also applies to the on-coming clutch, i.e., $T_{on}=(P_{oncmd}-P_{on})G_{on}$, wherein $T_{on}$ is the on-coming clutch torque, $P_{oncmd}$ is the commanded on-coming clutch pressure, $P_{on}$ is the oncoming clutch pressure adaptive parameter, and $G_{on}$ is a multiplication factor for the on-coming clutch. As with the off-going clutch, the equation $T_{on}=(P_{oncmd}-P_{on})G_{on}$ is solved using an optimal on-coming clutch torque obtained from a mathematical model to determine the commanded on-coming clutch pressure.

The on-coming pressure is maintained within a pressure range defined between that which is low enough to avoid a full feed state and high enough to start the ratio change in the expected time. Additionally, the on-coming pressure adaptive parameter is monitored to prevent the turbine speed from floating toward engine speed after the optimal time, and to prevent the turbine speed from floating at the engine speed for extended periods of time. Once these priorities are adhered to, the ratio change duration and the amount of closed loop offset is monitored to give an indication of how much torque exists on the on-coming element.

Figure 4:
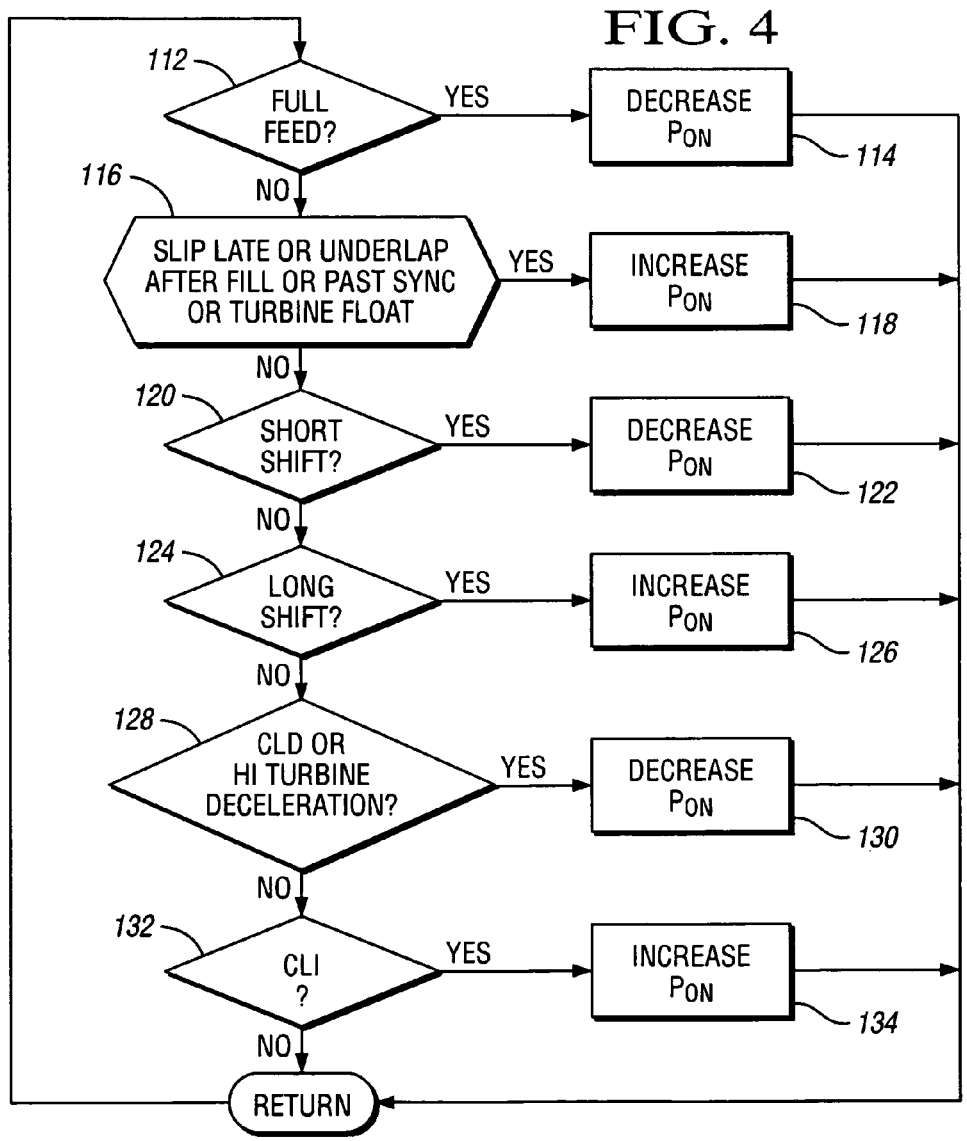
FIG. 4 is a block diagram illustrating a method of adjusting the on-coming pressure adaptive parameter of the present invention.

A corresponding method of adjusting an on-coming clutch pressure adaptive parameter is shown in FIG. 4. At step 112, if the control valve, shown at 90 in FIGS. 1 and 1A, corresponding to the on-coming clutch is at full feed, then the on-coming clutch pressure adaptive parameter ($P_{ON}$) is decreased at step 114. Subsequent to step 114, the method returns to step 112; thus, the on-coming clutch pressure adaptive parameter is decreased during subsequent shifts until the control valve is no longer at full feed. If, during a shift, the control valve is not at full feed, then the method includes determining whether shift aberrations "slip late," "underlap after fill," "past sync" and "turbine float," which are all potentially attributable to inadequate on-coming clutch pressure, occur (step 116).

Figure 6A:
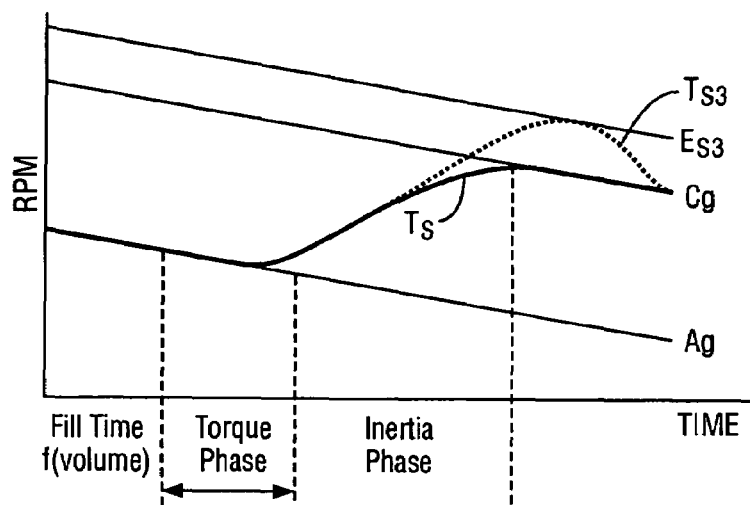
FIG. 6A is a graphical depiction of turbine speed during the shift aberration "synchronization"

Referring to FIG. 6A, slip late is a shift aberration wherein on-coming clutch capacity occurs more than a predetermined duration later than in the predefined optimal downshift $T_S$. If, for example, the on-coming clutch optimally gains capacity 50 milliseconds (ms) after the fill stage is complete, a delay resulting in the on-coming clutch gaining capacity more than 100 ms after the fill stage would be indicative of slip late. On-coming clutch capacity is indicated by turbine speed $T_s$ rising more than a predetermined amount, e.g., 50 rpm, above attained gear speed $A_g$.

Figure 6B:
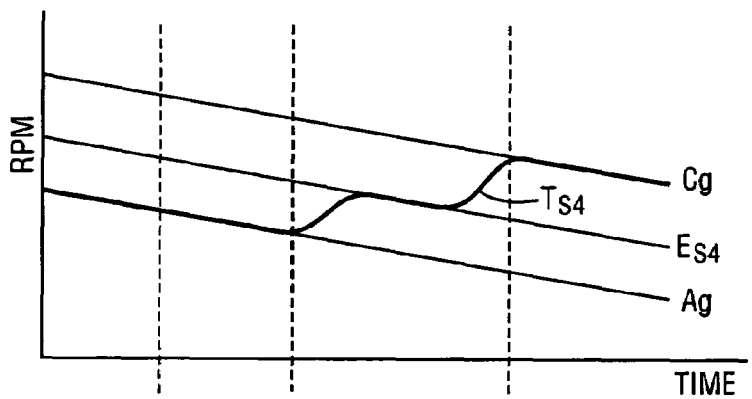
FIG. 6B is a graphical depiction of turbine speed during the shift aberration "turbine float"

Underlap after fill is detected when turbine speed falls more than a predetermined amount, e.g., 50 rpm, below attained gear speed $A_g$ after the fill stage. If the turbine speed remains at or near (e.g., +/−50 rpm) engine speed for more than a predetermined acceptable period of time, turbine float is indicated. Referring to FIG. 6B, turbine float is therefore identified by comparing turbine speed and engine speed, and recognizing that if turbine speed $T_{s4}$ is at engine speed $E_{s4}$ for an excessive duration, i.e., longer than a predetermined duration, turbine float occurs. The turbine speed $T_{s4}$ during turbine float is graphically depicted in FIG. 6B.

The turbine speed $T_{s3}$ during synchronization is graphically depicted in FIG. 6A and is contrasted by the solid line representation of turbine speed $T_s$ during the predefined optimal closed throttle downshift. Referring to FIG. 6A, it can be seen that during synchronization, the turbine speed $T_{s3}$ deviates from the commanded gear speed $C_g$ and goes toward engine speed $E_{s3}$ when engine speed $E_{s3}$ is greater than the commanded gear speed $C_g$. Synchronization or "past sync," is identified by comparing the turbine speed $T_{s3}$ and the commanded gear speed $C_g$. If turbine speed $T_{s3}$ rises more than a predetermined amount, e.g., 50 rpm, above commanded gear speed $C_g$, then synchronization is indicated. The shift aberrations slip late, underlap after fill, past sync and turbine float identified at step 116 are addressed at step 118 by increasing the on-coming clutch pressure adaptive parameter $P_{ON}$.

Figure 6C:
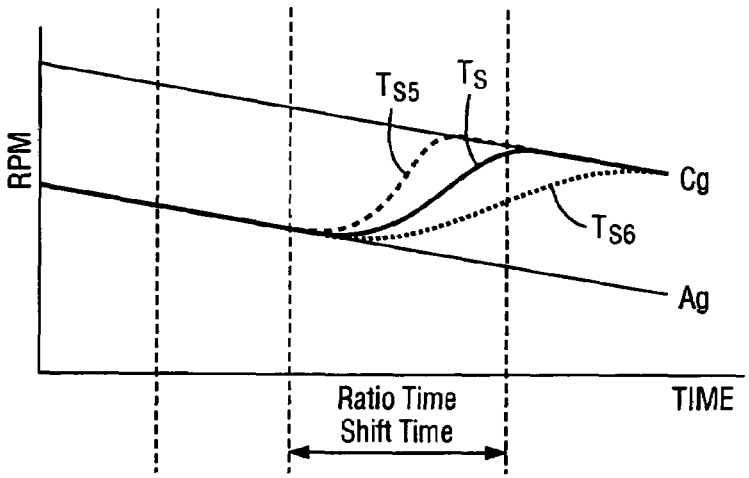
FIG. 6C is a graphical depiction of turbine speed during the shift aberrations "short shift," "long shift," "closed loop increase," and "closed loop decrease."

The turbine speed during a short shift and a long shift are graphically depicted by line $T_{s5}$ and line $T_{s6}$ of FIG. 6C, respectively, and are contrasted by the solid line representation of turbine speed $T_s$ during the predefined optimal closed throttle downshift. A short shift or long shift is identified at steps 120 and 124, respectively, by comparing the duration of the inertia phase of the on-coming clutch with a predetermined optimal shift time. The duration of the inertia phase is the period of time beginning when the turbine speed is a predetermined amount, e.g., 50 rpm, greater than the attained gear speed $A_g$ and ending when the turbine speed is a predetermined amount, e.g., 50 rpm, less than the commanded gear speed $C_g$. Insufficient inertia phase duration, i.e., in comparison to the predetermined optimal shift time, is indicative of a short shift, and the on-coming clutch pressure adaptive parameter is decreased at step 122 in response. Excessive inertia phase duration is indicative of a long shift and the on-coming clutch pressure adaptive parameter is increased in response at step 126.

The controller is configured for closed-loop control of commanded pressure. Accordingly, the controller is configured to recognize deviation between intended pressure and actual pressure based on deviation between actual turbine speed and intended turbine speed. Previously addressed shift aberrations are detected by the controller comparing the actual characteristics of a shift to a predefined optimal shift. When the controller performs steps 112, 116, 120, and 124 with no shift aberrations from optimal detected, the controller is configured to analyze information obtained from the closed loop control to adjust the oncoming pressure adaptive parameter accordingly.

The turbine speed during a closed loop increase and a closed loop decrease is graphically similar to a short shift and long shift, respectively. Therefore, referring to FIG. 6C, the turbine speed during a closed loop increase is graphically depicted by line $T_{s5}$, and the turbine speed during a closed loop decrease is graphically depicted by line $T_{s6}$. As error between actual turbine speed profile and intended turbine speed profile increases, the closed loop control causes the commanded pressure to proportionally increase to correct the error. A "closed loop increase" or a "closed loop decrease" occurs when the commanded pressure increases or decreases by more than a predetermined maximum threshold. A closed loop decrease is identified at step 128 and, in response, the on-coming pressure adaptive parameter is decreased at step 130. Similarly, a closed loop increase is identified at step 132 and, in response, the on-coming pressure adaptive parameter is increased at step 134.

High turbine deceleration is also identified at step 128 by monitoring the deceleration rate of the turbine. Turbine deceleration is calculated by subtracting the turbine speed at the end of the shift from the turbine speed at the beginning of the shift and dividing the resultant product by elapsed time. The on-coming pressure adaptive parameter is decreased at step 130 to adjust for excessive, i.e., in comparison to a predetermined maximum allowable, turbine deceleration.

The on-coming clutch volume adaptive parameter works in coordination with the on-coming pressure adaptive parameter. The first priority is to decrease the on-coming clutch volume adaptive parameter when an unexpected ratio change occurs. An unexpected ratio change indicates that the on-coming clutch prematurely gains capacity. The premature on-coming capacity may be attributable to the on-coming apply chamber filling too early, and therefore the on-coming clutch volume adaptive parameter is decreased. Another indicator of early fill occurs when the regulator valve changes to a regulating state earlier than the volume adaptive logic expects, and again such an indication is addressed by decreasing the on-coming clutch volume adaptive parameter. The next priority is to make sure the on-coming element gains capacity when expected. Much like the on-coming pressure adaptive, on-coming clutch volume is monitored to start the ratio change in the expected time, not float toward engine speed after the expected time, and not float at the engine speed for extended periods of time. An upper learned, or estimated, volume limit approximates a maximum possible fill chamber volume, i.e., the designed clutch apply chamber volume plus a maximum clutch apply chamber volume variation to account for manufacturing tolerances, wear, etc. Finally, once all the above volume criteria have been met, the on-coming volume adaptive is iteratively decreased until the above actions are not met once again. The iterative action is only allowed if a slip differential can be observed or engine speed is at the synchronization speed.

Figure 5:
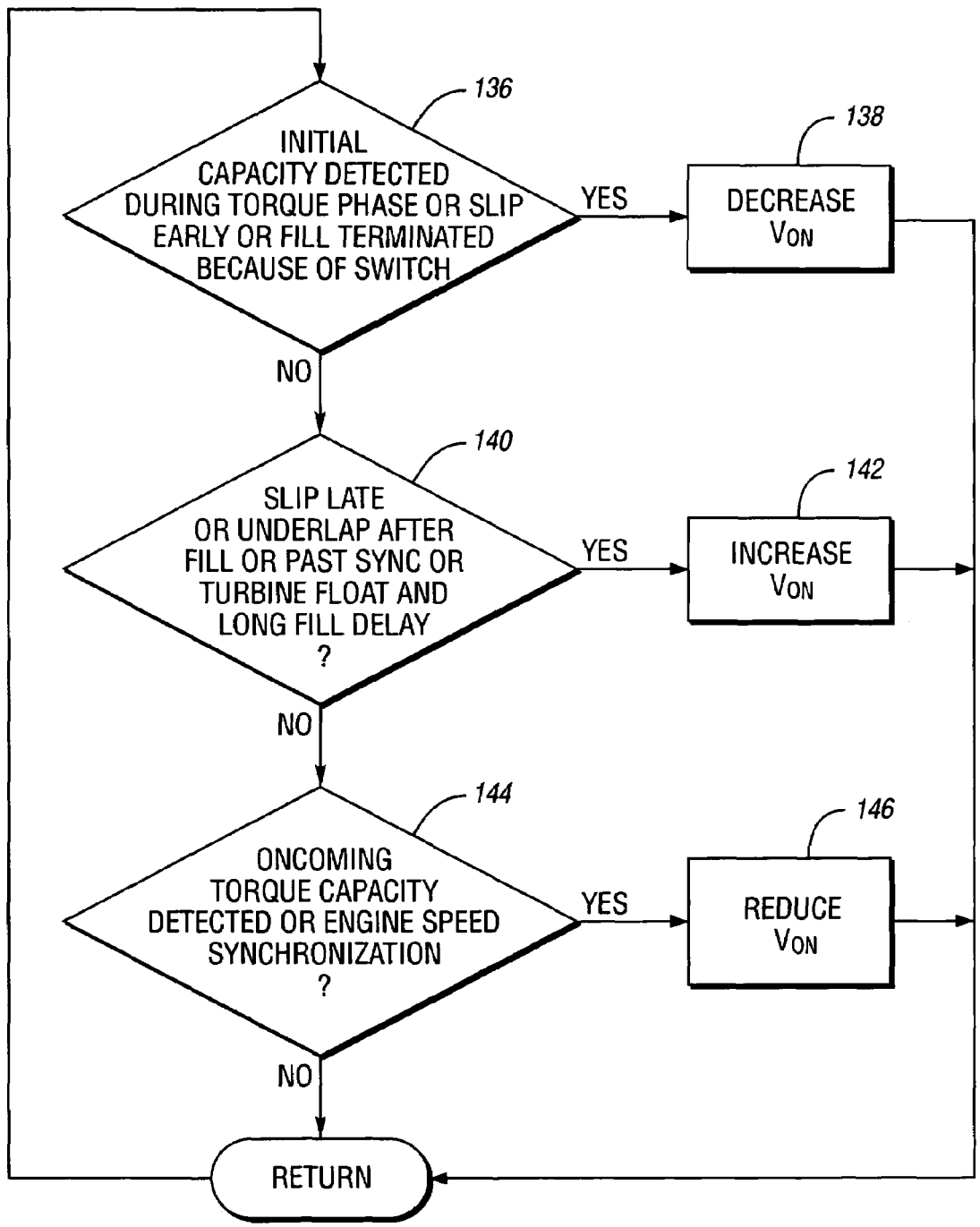
FIG. 5 is a block diagram illustrating a method of adjusting the on-coming volume adaptive parameter of the present invention.

A method of adjusting the on-coming clutch volume adaptive parameter is shown in FIG. 5. If on-coming clutch capacity is detected (e.g., turbine speed is more than 50 rpm above $A_g$, and more than 50 rpm above engine speed) during the fill phase or the torque phase, it may be attributable to an excessive calculated volume such that the apply chamber of the on-coming clutch fills prematurely. The torque phase is defined for purposes of this invention as the period of time beginning with the on-coming clutch volume reaching zero (end of the fill phase) and ending with the on-coming clutch gaining capacity (beginning of the inertia phase). Therefore, if initial on-coming clutch capacity is detected during the fill phase or the torque phase at step 136, the oncoming volume adaptive parameter ($V_{ON}$), used in calculating the estimated oncoming clutch volume for subsequent shifts, is decreased at step 138. Similarly, slip early may be indicative of an excessive calculated volume and, if detected at step 136, the oncoming volume adaptive parameter is decreased at step 138. Step 136 further monitors the duration during which the control valve corresponding to the on-coming clutch is at a full feed state. If the control valve is at full feed for a period greater than a predetermined threshold, the on-coming clutch volume adaptive parameter is decreased at step 138.

The aberrations slip late, underlap after fill, past sync and turbine float described hereinabove in the context of the on-coming pressure adaptive may be attributable to either inadequate pressure or inadequate calculated volume. Any of the aforementioned aberrations identified at step 140 are addressed by increasing the on-coming volume adaptive parameter at step 142. However, the on-coming volume adaptive parameter is increased at step 142 if and only if long fill delay is not indicated. "Long fill delay" occurs when the estimated volume computer by the controller exceeds the predefined upper learned volume limit. Any of the aberrations including slip late, underlap after fill, past sync and turbine float that suggest an increase of the learned volume above the upper learned volume limit are likely attributable to on-coming pressure rather than volume, and the problem is therefore addressed by the on-coming pressure adaptive described hereinabove. In this manner the on-coming pressure and volume adaptives work together to identify which is responsible for the aberration and thereafter address the aberration in the appropriate manner.

If on-coming torque capacity or engine speed synchronization is detected at step 144 and all other conditions above do not exist, the on-coming volume adaptive parameter is iteratively reduced at step 146 to address the aberration during subsequent closed throttle downshifts.

While the best mode for carrying out the invention has been described in detail, those familiar with the art to which this invention relates will recognize various alternative designs and embodiments for practicing the invention within the scope of the appended claims.

The invention claimed is:

1. A method for improving closed throttle downshifts of an automatic transmission, the method comprising:
   establishing an adaptive parameter for closed throttle downshift control;
   performing a plurality of closed throttle downshifts in which an oncoming clutch is engaged;
   determining, for each of said plurality of closed throttle downshifts, whether a valve associated with the oncoming clutch is at full feed; and
   adjusting the adaptive parameter after each of said closed throttle downshifts during which said valve is at full feed.

2. The method of claim 1, wherein the adaptive parameter is an oncoming clutch pressure adaptive parameter; and wherein the method further comprises increasing the adaptive parameter after each of said closed throttle downshifts during which a first predefined shift aberration occurs and during which the valve does not achieve full feed.

3. The method of claim 2, further comprising decreasing the adaptive parameter after each of said closed throttle downshifts during which a second predefined shift aberration occurs and during which the valve does not achieve full feed and the first predefined shift aberration does not occur.

4. The method of claim 3, wherein the first predefined shift aberration is one of slip late, underlap after fill, synchronization, and turbine float.

5. The method of claim 4, wherein the second predefined shift aberration is short shift.

6. The method of claim 5, further comprising increasing the adaptive parameter after each of said closed throttle downshifts during which a third predefined shift aberration occurs and during which the valve does not achieve full feed and the first and second predefined shift aberrations do not occur; wherein said third predefined shift aberration is long shift.

7. The method of claim 6, further comprising decreasing the adaptive parameter after each of said closed throttle downshifts during which a fourth predefined shift aberration occurs and during which the valve does not achieve full feed and the first, second, and third predefined shift aberrations do not occur wherein said fourth predefined shift aberration is high turbine deceleration.

8. The method of claim 1, wherein the adaptive parameter is an oncoming clutch volume adaptive parameter; wherein said adjusting the adaptive parameter includes adjusting the adapative parameter if said valve is at full feed for at least a predetermined duration; and wherein the method further comprises increasing the adaptive parameter after each of said closed throttle downshifts during which a first predefined shift aberration occurs and during which the valve does not achieve full feed.

9. The method of claim 8, further comprising decreasing the adaptive parameter after each of said closed throttle downshifts during which a second predefined shift aberration occurs and during which the valve does not achieve full feed and the first predefined shift aberration does not occur.

10. The method of claim 9, wherein said first predefined shift aberration is one of slip late, underlap after fill, synchronization, long shift, and turbine float.

11. The method of claim 10, wherein said second predefined aberration includes at least one of oncoming torque capacity detection and engine speed synchronization.

12. A control apparatus for an automatic transmission having an input shaft and an output shaft; a first clutch and a second clutch; a first and second fill chamber to which hydraulic fluid is supplied for hydraulic actuation of the first and second clutch, respectively; a first and second actuator configured to selectively allow pressurized fluid into the first and second fill chamber, respectively; a clutch valve associated with the second fill chamber and being selectively characterized by a full feed condition; wherein the first clutch and the second clutch are configured to effect a speed ratio change during a closed throttle downshift by disengagement of the first clutch and engagement of the second clutch, the control apparatus comprising:
   a controller operatively connected to the first actuator and the second actuator to control selective disengagement of the first clutch whereby the first clutch is an offgoing clutch, and engagement of the second clutch whereby the second clutch is an oncoming clutch;
   wherein said controller is programmed and configured to establish an adaptive parameter;
   wherein said controller is programmed and configured to monitor whether the clutch valve associated with the second fill chamber is at full feed during said closed throttle downshifts; and
   wherein said controller is programmed and configured to adjust the adaptive parameter in response to said clutch valve being at full feed during said closed throttle downshifts.

13. The apparatus of claim 12, wherein said controller is programmed and configured to generate oncoming clutch pressure commands to which the oncoming clutch is responsive, and wherein the adaptive parameter is an oncoming clutch pressure adaptive parameter on which the value of the oncoming clutch pressure commands depends.

14. The apparatus of claim 12, wherein said controller is configured to generate oncoming clutch pressure commands to which the on-coming clutch is responsive; wherein the controller is configured to determine when to generate the oncoming clutch pressure commands to effectuate a speed ratio change based on an estimated oncoming clutch apply chamber volume; and wherein the adaptive parameter is an oncoming clutch volume adaptive parameter on which the value of the estimated oncoming clutch apply chamber volume is dependent.

15. A method comprising:
   monitoring transmission operating characteristics during a plurality of closed throttle downshifts;
   determining whether, for each of the plurality of downshifts, the transmission operating characteristics indicate the occurrence of a first predefined shift aberration from a predefined optimal downshift, said first predefined shift aberration including a valve of an oncoming clutch being at full feed; and
   adjusting the value of the adaptive parameter after each of said downshifts for which the transmission operating characteristics indicate the occurrence of the first shift aberration.

16. The method of claim 15, wherein said adjusting the value of the adaptive parameter includes adding a corrective value to the adaptive parameter.

17. The method of claim 15, further comprising varying the corrective value in response to the quantity of consecutive monitored downshifts in which the first predetermined shift aberration occurs.

18. The method of claim 15, further comprising determining, only for downshifts in which the transmission operating characteristics do not indicate the occurrence of the first shift aberration, whether the transmission operating characteristics indicate the occurrence of a second predefined shift aberration.

19. The method of claim 15, further comprising determining, for each of the plurality of downshifts, whether the transmission operating characteristics indicate the occurrence of a second predefined shift aberration; and adjusting the adaptive parameter in response to the occurrence of the second shift aberration only when the transmission operating characteristics do not indicate the occurrence of the first shift aberration.

* * * * *